United States Patent
Miyazawa et al.

(10) Patent No.: US 7,458,101 B2
(45) Date of Patent: Nov. 25, 2008

(54) INFORMATION VIEWING/LISTENING SYSTEM, INFORMATION PLAYER, AND INFORMATION PROVIDER

(75) Inventors: Yasunaga Miyazawa, Okaya (JP); Mitsuhiro Inazumi, Shiojiri (JP); Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1095 days.

(21) Appl. No.: 10/751,957

(22) Filed: Jan. 7, 2004

(65) Prior Publication Data

US 2004/0210925 A1    Oct. 21, 2004

(30) Foreign Application Priority Data

Jan. 20, 2003    (JP)    ............... 2003-011232

(51) Int. Cl.
G06F 7/04 (2006.01)
G06F 17/30 (2006.01)
G06K 9/00 (2006.01)
H03M 1/68 (2006.01)
H04K 1/00 (2006.01)
H04L 9/00 (2006.01)
H04L 9/32 (2006.01)
H04N 7/16 (2006.01)

(52) U.S. Cl. ........................... 726/29; 380/4
(58) Field of Classification Search ............... 726/29
See application file for complete search history.

(56) References Cited

U.S. PATENT DOCUMENTS 4,800,590 A * 1/1989 Vaughan ................. 713/184
5,402,492 A * 3/1995 Goodman et al. ............. 726/20
6,052,803 A * 4/2000 Bhatia et al. .................. 714/49
6,094,659 A * 7/2000 Bhatia ..................... 707/104.1
6,108,330 A * 8/2000 Bhatia et al. ................ 370/352
6,118,768 A * 9/2000 Bhatia et al. ................ 370/254
6,212,410 B1    4/2001 Ishida
6,813,474 B2 * 11/2004 Robinson et al. ........... 434/353
6,885,901 B2 * 4/2005 Tomii .......................... 700/97

FOREIGN PATENT DOCUMENTS

JP    A 2001-067795    3/2001

* cited by examiner

Primary Examiner—Kambiz Zand
Assistant Examiner—Dant B Shaifer Harriman
(74) Attorney, Agent, or Firm—Oliff & Berridge, PLC (57) ABSTRACT

To impose a restriction on actual use, such as playback, of content data and to reduce or prevent unauthorized use of content data by a unit that is not registered with an information provider, in response to an operation request to play content data recorded in a user unit, the user unit transmits current time information, the unit ID, content information, and operation information to a service center and, using these pieces of information, creates a one-time password that is valid only for a predetermined period of time. On the basis of the information transmitted from the user unit and current time information obtained from a time keeping unit of the service center, the service center similarly creates a one-time password and an operation permission command and transmits them to the user unit. The user unit compares the two one-time passwords. When the two one-time passwords match each other, the user-requested operation (playback) is executed.

14 Claims, 6 Drawing Sheets

INFORMATION VIEWING/LISTENING SYSTEM, INFORMATION PLAYER, AND INFORMATION PROVIDER

BACKGROUND OF THE INVENTION

1. Field of Invention

The present invention relates to an information viewing/listening system in which various types of information, such as music and movies, can be obtained via a network and viewed/listened to, an information player, and to an information provider.

2. Description of Related Art

Services that enable a user to obtain information, such as music, movies, and games (referred to as content data), from a service center or the like via the Internet (hereinafter referred to as content data services) have become widely used.

A general content data service lets the user download content data stored at an information provider side (referred to as a service center) via the Internet, record the content data in an information player having a function of at least playing content data (including not only a music player and a video player, but also a personal computer), and play the recorded content data. In such a content data service, a fee charged for using content data is generally paid by a credit card or the like via a network.

Since data handled in this type of content data service is digital data, the data can be copied almost without degradation. As such, the data may be transmitted without authorization and recorded into a unit owned by a user who has not paid a usage fee (unauthorized copying).

To address this problem, for example, a method is disclosed in Japanese Unexamined Patent Application Publication No. 2001-67795.

This prior art causes a plurality of information receivers having different pieces of registration information for using content data to exchange the registration information, thereby enabling the information receivers to mutually determine whether they are authorized to use the content data. Of the plural information receivers, a first information receiver that has the right to use the content data transfers this usage right to a second information receiver determined by the first information receiver as authorized to use the content data, thereby enabling the second information receiver having received the usage right to use the content data. Accordingly, content data received by the first information receiver is transmitted to the second information receiver, and the transmitted content data is recorded (copied) in the second information receiver.

This prior art requires an information receiver to which content data is copied to exchange beforehand information with a service center or the like and to register registration information for using the content data. Even when the above-described second information receiver has a function of playing the content data (including a function of decrypting the content data since this type of content data is generally encrypted), if the second information receiver has no registration information, the data in the first information receiver cannot be copied to the second information receiver.

It is impossible for a unit having received content data (first information receiver in the example of the prior art described above) to transmit this content data to be copied beforehand to another unit (second information receiver in the example of the prior art described above), and then the second information receiver makes a contract with a service center or the like and obtains registration information. Even an authorized copy to be made afterwards is restricted.

Since this prior art imposes no restrictions on a decryption method for playing content data (in this case, decryption includes both decoding encoded content data and decrypting encrypted content data), when content data recorded in a memory (RAM or HDD, for example) of a particular information receiver is read in one way or another, the read content data itself can be copied without authorization to another unit, and the copied content data can be played on the unit having the unauthorized copy.

To decrypt encrypted content data, there is a method using a content key for decryption, which is received via a network. Since this content key is included in encrypted data, the encrypted data is rarely copied without authorization. When the encrypted data is read in one way or another, the content data is decrypted without authorization.

To prevent unauthorized decryption, the content key is periodically updated. Every time the content key is updated, the encrypted content data must be re-received.

To enhance security, the content key must be updated very frequently. When the content key is updated very frequently, the encrypted data must be re-received many times. In this case, when the content data is large, as in a movie, an information receiver at the user side must perform a great amount of arithmetic processing every time it receives the content data. Since the transmitted data is large, the network load is high.

Practically, the content key cannot be updated very frequently. The same content key must be used for a certain period of time. When a period of time before the content key is updated is excessively long, the content key and the content data may be copied to another unit without authorization.

As described above, a known content data service system including the above-described prior art carries out various measures to prevent unauthorized copying of content data and to charge a legitimate fee, when viewed from the service center side. However, when viewed from the user side, user-friendliness is unsatisfactory, and there is much room for improvement.

SUMMARY OF THE INVENTION

Accordingly, the present invention reduces or prevents unauthorized use of content data to charge a legitimate, detailed fee for a content data service by detecting the operation status of a user, thereby providing a user-friendly information viewing/listening system.

To achieve the above, an information viewing/listening system of an aspect of the present invention includes an information provider that stores content data to be provided to a user and an information player that establishes a connection to the information provider via a network and plays information. When the user makes a request for an operation to the information player for use of content data recorded in the information player, the information player creates a password using preset information and transmits the preset information to the information provider. When the information provider receives the preset information transmitted from the information player, the information provider creates a password using preset information and transmits the password to the information player. When the information player compares the password transmitted from the information provider with the password created by the information player and when, as a result of comparison, the passwords are verified, the information player executes the operation requested by the user.

In the information viewing/listening system, the preset information to create the password includes at least current time information and unit-unique information that is unique to the information player. The password created using the present information is a password that is valid only for a predetermined period of time.

In the information viewing/listening system, the creation of the password by the information player and, in response thereto, the creation of the password by the information provider for the information player are performed when a playback request to playback the content data recorded in the information player is made, the playback being one of operations performed on the information player by the user.

In the information viewing/listening system, the creation of the password by the information player and, in response thereto, the creation of the password by the information provider for the information player are performed when any of operation requests for a plurality of predetermined types of operations is made, the operations being among operations performed on the information player by the user.

In the information viewing/listening system, when the information player obtains content data from the information provider or another information player, the information player is permitted to obtain the content data without creating the password.

In the information viewing/listening system, necessary information to create the password includes, in addition to the unit-unique information and the current time information, at least one of operation information indicating an operation performed by the user, information indicating the content data for which the operation is performed, and user information concerning the user.

According to the information viewing/listening system of an aspect of the present invention, when the user performs an operation to use content data recorded in the information player, the information player creates a password. At the same time, the information provider creates a password and transmits the password to the information player. The information player compares the password transmitted from the information provider with the password created by the information player and, when the comparison result verifies the passwords, the information player performs the operation requested by the user. A restriction, such as password matching, is imposed on use of content data recorded in the information player. Use of the content data is permitted only when the passwords match each other.

This reduces or prevents unauthorized use of content data by a unit that is not registered with the information provider. To obtain content data from the information provider, the information player is registered with the information provider, thereby easily obtaining the content data. The obtained content data can be stored in a content-data recording unit of the information player. Content data includes not only that obtained from the information provider, but also that copied from another unit.

According to an aspect of the present invention, although content data can be obtained or copied easily, a restriction is imposed on the use (such as playback) of the content data.

According to an aspect of the present invention, a password serving as a key to use (such as playing) content data on the player is a password that is uniquely present in the time domain and that is valid only for a predetermined period of time (this password is referred to as a one-time password). This reduces or prevents unauthorized use, which may occur due to using a content key for a predetermined period of time, as in related art services. Since a one-time password can be created using a not-so-complex algorithm, no great load is placed on an arithmetic processing unit.

The creation of the password by the information player and, in response thereto, the creation of the password by the information provider for the information player are performed when at least a playback request to playback the content data recorded in the information player is made. In other words, a password creating process is always performed when the user views/listens to content data. This reduces or prevents unauthorized use, such as viewing/listening to content data, without paying a usage fee.

The creation of the password by the information player and, in response thereto, the creation of the password by the information provider for the information player are performed when any of operation requests for a plurality of predetermined types of operations is made.

Accordingly, operation restrictions can be imposed on various manners of using content data. This reduces or prevents unauthorized use, which is without paying a usage fee, or unprescribed use of content data.

When the information player obtains content data from the information provider or another information player, the information player is permitted to obtain the content data without creating the password. Accordingly, when a unit (first user unit) tries to copy content data obtained from the information provider to another unit (second user unit) with a function of playing the content data, as in the first user unit, the content data in the first user unit is copied to the second user unit, and, subsequently, the second user unit is registered with the information provider, thereby enabling playback of the content data after the registration. Such usage enhances user-friendliness.

Necessary information to create the password includes, in addition to unit-unique information and current time information, at least one of operation information indicating an operation performed by the user, information indicating the content data for which the operation is performed, and user information concerning the user (e.g., user ID).

Since the password is created using various types of information, the secrecy of the password becomes high. Accordingly, unauthorized use of content data is reduced or prevented in a more secure manner. By transmitting operation information to the information provider side, the operation performed by the user can be detected at the information provider side. When viewed from the information provider side, a fee can be charged for every operation performed by the user. Accordingly, legitimate and detailed fee charging based on the details of an operation performed by the user can be performed. For example, a fee charged for playback can be changed depending on the details of content data. Fee charging based on various uses, such as a fee charged for repeated playback and a fee charged for transferring content data to another unit, can be performed.

When viewed from the user side, which receives the service, a fee is charged in accordance with the details of the operation. The user becomes less dissatisfied with the usage fee.

By transmitting, from the information player, information indicating the content data to be used by the user, a usage fee can be defined for each piece of content data used by the user. Accordingly, detailed fee settings can be designed.

An information player of an aspect of the present invention is an information player that establishes a connection via a network to an information provider having content data stored therein and that is capable of at least playing content data recorded therein. The information player includes a content-data recording device to record content data obtained from the information provider or another information unit; unit-unique-information recording unit to record unit-unique information that is unique to the information player; a time-information output device to output current time information;

a playback-signal output device to output, as a playback signal, the content data recorded in the content-data recording device; a password creating device to create a password using preset information when a user makes an operation request to the information player; a control command unit to verify, as a control command process, the validity of the password and, when the validity is verified, making the operation request valid; and a data transmitter-receiver to exchange a signal with the information provider via the network.

In the information player, the preset information to create the password includes at least the current time information and the unit-unique information unique to the information player. The password created using the present information is a password that is valid only for a predetermined period of time.

In the information player, the creation of the password is performed when a playback request to playback the content data recorded in the information player is made, the playback being one of operations performed on the information player by the user.

In the information player, the creation of the password is performed when any of operation requests for a plurality of predetermined types of operations is made, the operations being among operations performed on the information player by the user.

In the information player, when the information player obtains content data from the information provider or another information player, the information player is permitted to obtain the content data without creating the password.

In the information player, necessary information to create the password includes, in addition to the unit-unique information and the current time information, at least one of operation information indicating an operation performed by the user, information indicating the content data for which the operation is performed, and user information concerning the user.

According to the information player of an aspect of the present invention, when the user performs an operation to use content data recorded in the information player, the information player creates a password and transmits the password to the information provider. The information provider checks the transmitted password against a password created by the information provider. The operation requested by the user is executed only when the validity of the password is verified. In other words, a restriction, such as password matching, is imposed on use of content data recorded in the information player. Use of the content data is permitted only when the passwords match each other.

This reduces or prevents unauthorized use of content data by a unit that is not registered with the information provider. To obtain content data from the information provider, the information player is registered with the information provider, thereby easily obtaining the content data. The obtained content data can be stored in a content-data recording unit of the information player. Content data includes not only that obtained from a service center, but also that copied from another unit.

The information player of an aspect of the present invention can easily obtain or copy content data, and a restriction is imposed on the use (such as playback) of the content data. Therefore, the information player becomes user-friendlier.

Since the password created by the information player is a one-time password only valid for a predetermined period of time, unauthorized use, which may occur due to using a content key for a predetermined period of time, as in related art services, is reduced or prevented.

An information provider of an aspect of the present invention is an information provider capable of providing content data to an information player at a user side, the information player being registered by a predetermined process. The information provider includes a data transmitter-receiver to exchange a signal with the information player via a network; a content-data recording unit to store content data that can be provided to the registered information player; a unit-unique-information recording unit to record unit-unique information unique to each registered information player; a user-information recording unit to record, as user information, information concerning the user using the registered information player; a unit-information recording unit to record, as unit information, information concerning each information player, the information including a function of the registered information player; a time-information output device to output current time information; and a password creating device to create a password using preset information when the information player performs an operation.

In the information provider, the preset information to create the password includes at least the current time information and the unit-unique information unique to the information player. The password created using the present information is a password that is valid only for a predetermined period of time.

As described above, the information provider of an aspect of the present invention creates a password using preset information and transmits the password to the information player. The information player performs password matching and, only when the validity of the password is verified, performs the operation requested by the user. According to the information provider of an aspect of the present invention, unauthorized use of content data by a unit that is not registered with the information provider is reduced or prevented only by creating a one-time password using preset information.

Since this password is a one-time password based on the current time, unauthorized use, which may occur due to using a content key for a predetermined period of time, as in related art services, can be reduced or prevented. Since the one-time password can be created using a not-so-complex algorithm, the creation is done by a relatively simple arithmetic operation.

DETAILED DESCRIPTION OF EXEMPLARY EMBODIMENTS

First Exemplary Embodiment

Figure 1:
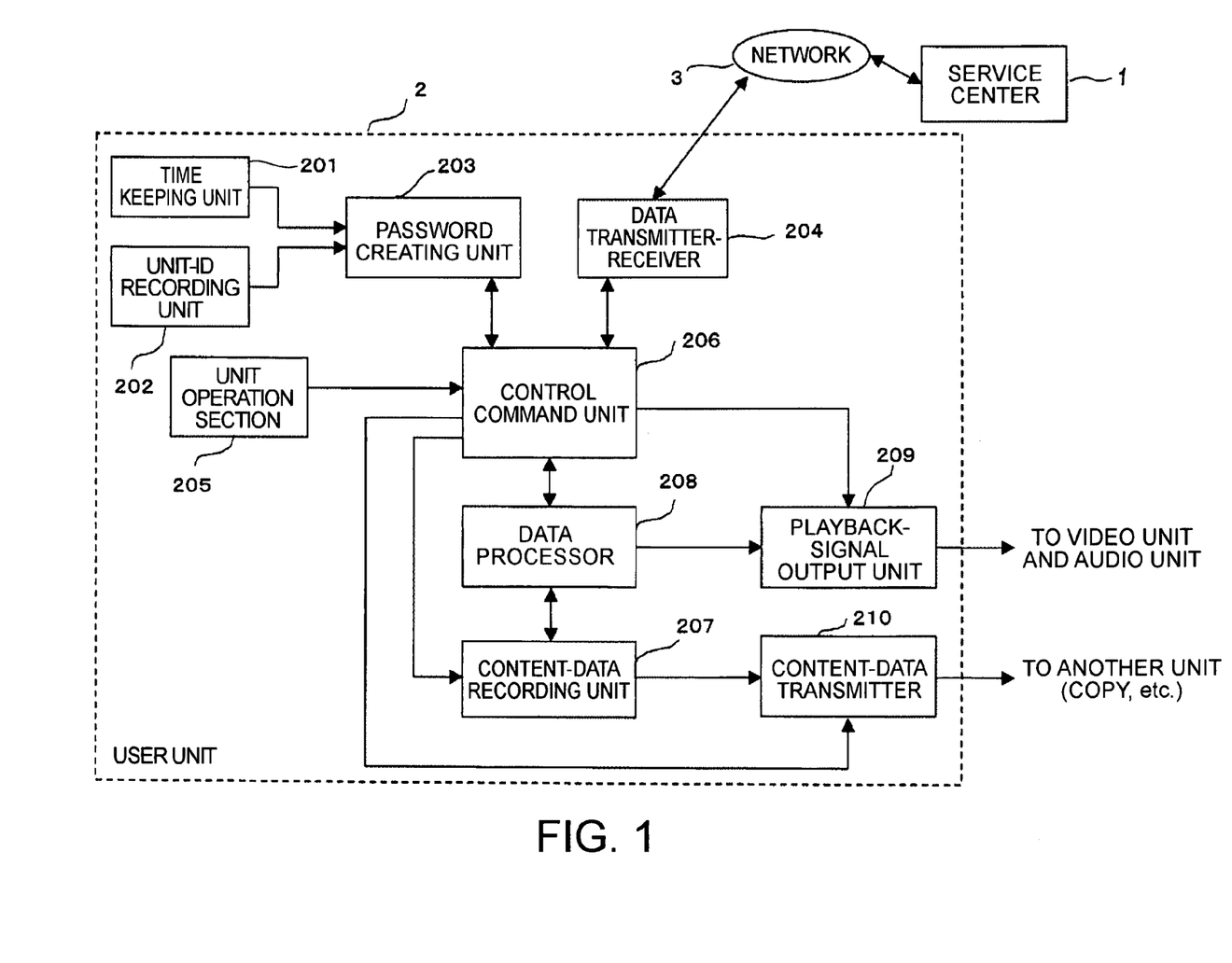
FIG. 1 illustrates the configuration of an information viewing/listening system of an aspect of the present invention, which is a block schematic mainly showing the configuration of an information player (user unit) at a user side.

FIG. 1 shows the configuration of an information viewing/listening system according to a first exemplary embodiment of the present invention. This information viewing/listening system is largely divided into a service center 1 serving as an information provider and a user unit 2 serving as an information player. The two components are connected to a network 3 and can exchange information with each other. FIG. 1 is a schematic mainly showing the configuration of the user unit 2. The configuration of the service center 1 will be described later.

The user unit 2 shown in FIG. 1 has a function of obtaining content data from the service center 1 or another user unit 2, recording the content data, and outputting the content data as a signal that can be played by a video unit or an audio unit. The user unit 2 is not limited to a particular unit and includes any unit with such a function. For example, the user unit 2 may be a player dedicated to playing music or video, a personal computer, a television, a radio receiver, a vehicle-mounted unit, a game machine, and an electronic book viewer.

In FIG. 1, the user unit 2 is provided with no video unit and no audio unit. Alternatively, the user unit 2 may be provided with a video unit and an audio unit. FIG. 1 shows only components of the user unit 2, which are necessary for describing an aspect of the present invention.

A simple description of the configuration of the user unit 2 will now be given. The user unit 2 includes a time keeping unit 201 that outputs current time information; a unit-ID recording unit 202 that records information unique to the user unit 2 (referred to as a unit ID); a password creating unit 203 that creates a password that is valid only at a particular time (which may tolerate some deviations) on the basis of at least the current time information obtained by the time keeping unit 201 and the unit ID recorded in the unit-ID recording unit 202 (hereinafter referred to as a one-time password); a data transmitter-receiver 204 that serves as an interface with the service center 1 and that exchanges information with the service center 1; a unit operation section 205 operated by a user to perform various operations, such as playback and fast-forwarding; a control command unit 206 that gives a control command to each component included in the user unit 2; a content-data recording unit 207 that records content data obtained from the service center 1 or another user unit in one way or another; a data processor 208 that performs various types of data processing serving as processing by an information player; a playback-signal output unit 209 that outputs the data processed by the data processor 208 as a playback signal to a video unit and/or an audio unit; and a content-data transmitter 210 to transmit the content data recorded in the content-data recording unit 207 to another user unit.

Figure 2:
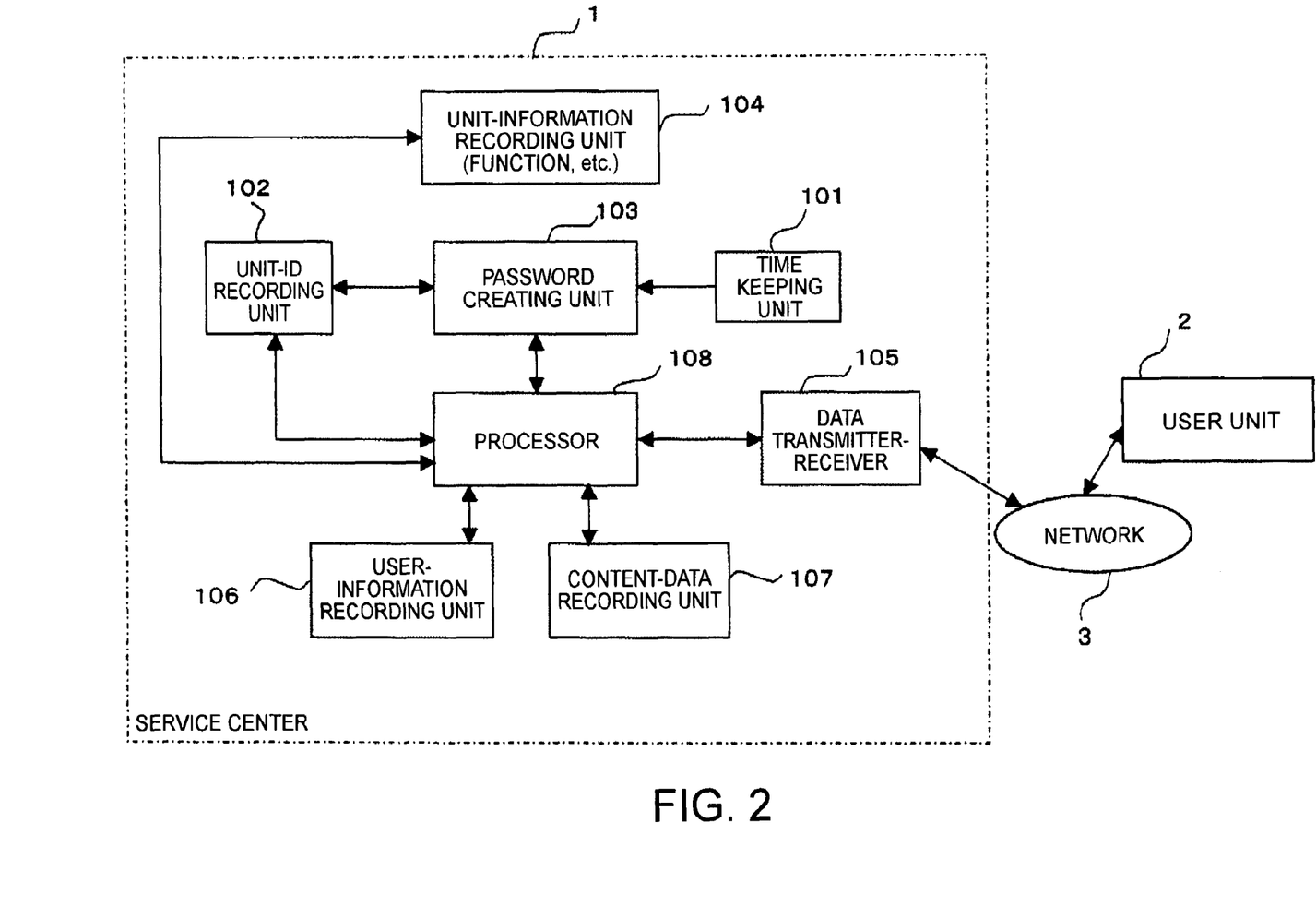
FIG. 2 illustrates the configuration of the information viewing/listening system of an aspect of the present invention, which is a block schematic mainly showing the configuration of an information provider (service center)

FIG. 2 illustrates the configuration of the service center 1 serving as the information provider. FIG. 2 shows only necessary components of the service center 1 for describing an aspect of the present invention.

The service center 1 includes a time keeping unit 101 that outputs current time information; a unit-ID recording unit 102 that records the unit ID of the user unit 2 registered with the service center 1; a password creating unit 103 that creates a password that is valid only at a particular time (which may tolerate some deviations) (one-time password) on the basis of, of information transmitted from a particular user unit 2 when this user unit 2 tries to perform an operation, such as playback, the same information used by the user unit 2 to create a password and the current time information obtained from the time keeping unit 101 of the service center 1; a unit-information recording unit 104 that records information indicating a function(s) of each user unit 2 registered with the service center 1 (unit information) for each user unit 2; a data transmitter-receiver 105 that serves as an interface with the user unit 2 and that exchanges information with the user unit 2; a user-information recording unit 106 that records information on the user using each registered user unit 2 (user ID individually given to each user and the details of a contract made by the user with the service center 1); a content-data recording unit 107 that records various types of content data that can be provided for services to the user; and a data processor 108 that uses information obtained from these components to perform various types of processing serving as processing by the service center 1.

Of the components of the user unit 2 shown in FIG. 1 and the components of the service center 1 shown in FIG. 2, the password creating unit 203 of the user unit 2, the password creating unit 103 of the service center 1, the unit-ID recording unit 202 of the user unit 2, the unit-ID recording unit 102 of the service center 1, the user-information recording unit 106 of the service center 1, the data processor 208 of the user unit 2, and the data processor 108 of the service center 1 are tamper-resistant hardware or software, and, as such, no alterations are to be made in data or processes.

Where necessary, the processing details and the operation of the components of the user unit 2 shown in FIG. 1 and the components of the service center 1 shown in FIG. 2 will be described specifically in the operation described below.

Figure 3:
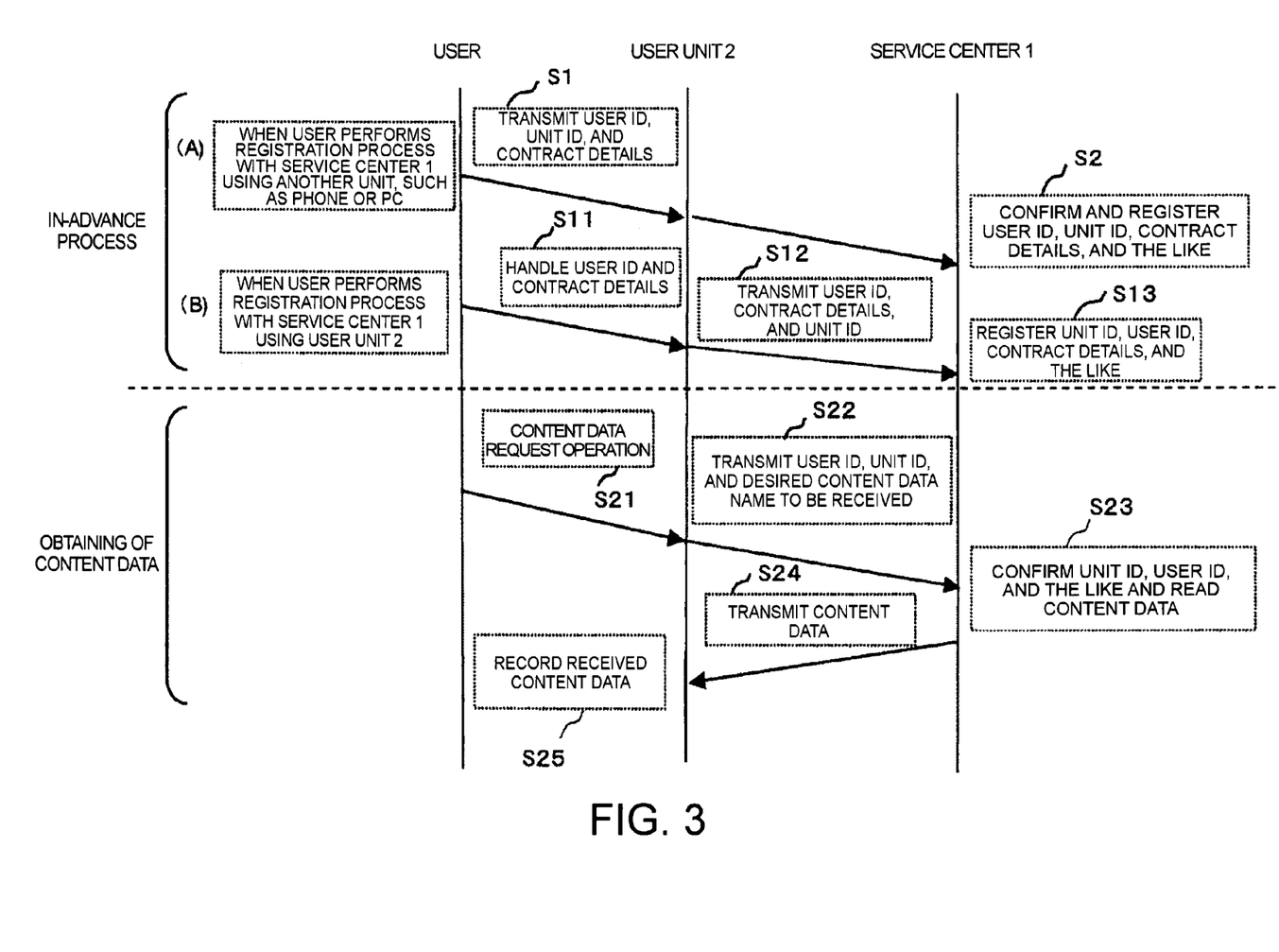
FIG. 3 illustrates the flow of a process performed by the information viewing/listening system of an aspect of the present invention, which is a process of registering the information player (user unit) at the user side with the information provider (service center) by performing an in-advance process and subsequently obtaining desired content data.
Figure 4:
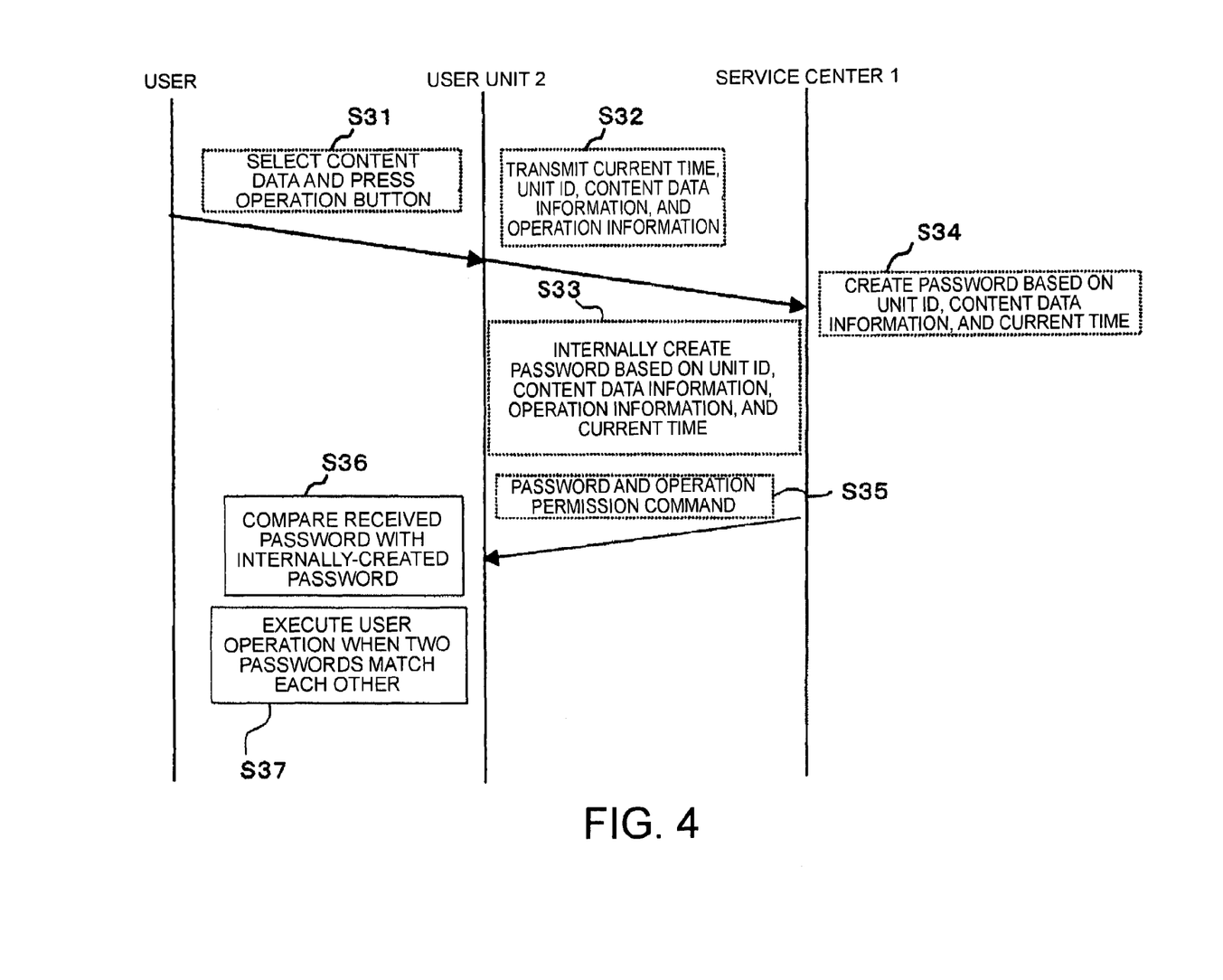
FIG. 4 illustrates the flow of a process performed by the information viewing/listening system of an aspect of the present invention, which is a process of playing content data obtained in the information player (user unit) at the user side.

FIGS. 3 and 4 illustrate the flow of processes according to an aspect of the present invention. FIG. 3 is a chart describing a process in which the user unit 2 is registered with the service center 1 by performing an in-advance process and subsequently the user unit 2 obtains desired content data. FIG. 4 is a chart describing a process of playing obtained content data in the user unit 2.

The in-advance process shown in FIG. 3 is to register, with the service center 1, the user ID of the user, the unit ID of the user unit 2 used by the user, and the details of a contract including the type and scope of services (including the fee payment method and the like). Referring to FIG. 3, steps of the in-advance process will now be described.

The in-advance process includes two possible methods: a method, such as that shown in (A) of FIG. 3, in which the user registers the user unit 2 with the service center 1 using a telephone or another unit (unit other than the user unit 2 to which the content data service is to be provided; when there is a personal computer other than the user unit 2 to which the content data service is to be provided, this personal computer is one possible unit); and a method, such as that shown in (B) of FIG. 3, in which the user uses the user unit 2 to which the content data service is to be provided to register the user unit 2 with the service center 1.

In the case of (A), the user notifies the service center 1 of the user ID of the user, the unit ID of the user unit 2 to which the content service is to be provided, and the details of a contract using a telephone or PC (step S1).

In response to the notification from the user, the service center 1 confirms the user ID, the unit ID, and details of the contract, registers the user ID and the details of the contract in the user-information recording unit 106, and records the unit ID in the unit-ID recording unit 102 (step S2). At this time, the user ID, the details of the contract, and the unit ID are recorded in association with one another.

In the case of (B), the user uses the user unit 2 to which the content service is to be provided to input the user ID of the user and the details of a contract (step S11). Accordingly, the user unit 2 transmits the user-designated user ID and the details of the contract and the unit ID stored in the unit-ID recording unit 202 of the user unit 2 to the service center 1 using the data transmitter-receiver 204 (step S12).

In response to the notification from the user unit 2, the service center 1 confirms the user ID, the unit ID, and the details of the contract, registers the user ID and the details of the contract in the user-information recording unit 106, and records the unit ID in the unit-ID recording unit 102 (step S13). In this case, the user ID, the details of the contract, and the unit ID are recorded in association with one another, as described above.

With the method of (A) or (B), the user ID of the user, the unit ID of the user unit 2 to which the service is to be provided, and the details of the contract for the service are registered with the service center 1. Accordingly, the in-advance process is completed.

When the in-advance process is completed in this manner, the user unit 2 can obtain a service provided by the service center 1. For example, to obtain content data, such as music, a movie, or a game, stored in the service center 1, similarly as shown in FIG. 3, the user makes a request to obtain the content data using the unit operation section 205 of the user unit 2 (step S21). On the basis of the user operation, the control command unit 206 outputs the user ID, the unit ID, and the desired content data name to be received (when the content data is a piece of music, the title or the specific number indicating this piece of music) to the data transmitter-receiver 204. The data transmitter-receiver 204 transmits these pieces of data to the service center 1 (step S22).

When the data transmitter-receiver 105 of the service center 1 receives data, such as the user ID, the unit ID, and the content data name transmitted from the user unit 2, the data processor 108 confirms the received data, that is, determines whether the received pieces of data match the unit ID recorded in the unit-ID recording unit 102 and the user ID recorded in the user-information recording unit 106. When these pieces of data are verified, the content data specified by the user is read from the content-data recording unit 107 (step S23), and the content data (encrypted data) is transmitted to the user unit 2 (step S24).

When the data transmitter-receiver 204 of the user unit 2 receives the content data transmitted from the service center 1, the control command unit 206 stores the content data in the content-data recording unit 207 (step S25). Accordingly, the user-desired content data is obtained.

A process of playing content data recorded in the content-data recording unit 207 of the user unit 2 will now be described.

It is assumed that a plurality of pieces of content data is already stored in the content-data recording unit 207 of the user unit 2. These pieces of content data may be obtained by the above-described process from the service center 1 and/or may be copied from content data recorded in another user unit 2.

Content data to be played is selected, and an operation is performed on the unit operation section 205 to play the selected content data. Specifically, a play button is pressed (step S31).

When the user performs such a playback operation, in this case, the data transmitter-receiver 204 of user unit 2 transmits the unit ID information of the user unit 2, which is recorded in the unit-ID recording unit 202, user-desired content data information, and user-performed operation information (the operation in this case is "playback"), and the current time information obtained from the time keeping unit 201 to the service center 1 (step S32). Using these pieces of information, the user unit 2 creates a one-time password (step S33).

Although necessary information to create the one-time password includes the unit ID and the current time information, other types of information may additionally be included. In this case, in addition to the user ID information and the current time information, content data information and user-performed operation information are used to create the one-time password, which is performed by the password creating unit 203.

As described above, the necessary information to create the one-time password may include, in addition to the unit ID and the current time information, several pieces of information. Needless to say, types of information to be used in creating the one-time password must be determined in advance. Although the one-time password is created using the unit ID information, the content data information, the operation information, and the current time information in this example, not all of the pieces of information are necessary to create the one-time password. Information other than the unit ID information and the current time information is unessential. Alternatively, other information, such as the user ID, may additionally be used. Types of information, other than the unit ID information and the current time information, to be used in creating the one-time password are determined in advance.

On the basis of the information transmitted from the user unit 2, the service center 1 creates a one-time password using the same types of information as the user unit 2 uses to create the one-time password. Since the user unit 2 uses, in addition to the current time information and the unit ID information, the content data information and the operation information in this case, the password creating unit 103 creates a one-time password by using the current time information obtained from the time keeping unit 101, and the current time information, the unit ID information, the content data information, and the operation information transmitted from the user unit 2, and by referring to the unit-ID recording unit 102, the unit-information recording unit 104, and the like (step S34).

Since these one-time passwords are created by the user unit 2 and the service center 1 using the same information and the same algorithm, the same one-time password is created by the user unit 2 and the service center 1. This one-time password is created using the current time (including the date and the current time) serving as one element. Since the current time is expressed in seconds, the one-time password is only valid at a limited time. In other words, the one-time password is uniquely present in the time domain including the date.

Taking into consideration the necessary time for the user unit 2 to communicate with the service center 1, the current time information transmitted from the user unit 2 at the user side (the current time kept by the time keeping unit 201 of the user unit 2) may include a more-or-less permissible time deviation (ranging from approximately several seconds to dozens of seconds).

When the one-time password is also created at the service center 1 side as described above, this one-time password and an operation permission command in response to the user operation request in this case are transmitted to the user unit 2 (step S35).

When the user unit 2 receives the one-time password and the operation permission command transmitted from the service center 1, the control command unit 206 of the user unit 2 compares the one-time password created by the password creating unit 203 of the user unit 2 with the one-time password transmitted from the service center 1 and determines whether the two passwords match each other (step S36). When the two passwords match each other, the user-performed operation is executed (step S37). That is, since the user is trying to perform playback in this case, the control command unit 206 outputs a control signal to perform playback.

As a result, of content data recorded in the content-data recording unit 207 of the user unit 2, content data selected by the user is read by the data processor 208 and decrypted to be playable, and the decrypted signal is output from the playback-signal output unit 209 to a video unit and/or an audio unit. As described above, the video unit and/or the audio unit may be included in the user unit 2.

According to this exemplary embodiment, pre-registration of the user ID and the unit ID with the service center 1 enables content data stored in the service center 1 to be obtained and imported into the user unit 2. To play this content data, the user unit 2 and the service center 1 create one-time passwords on the basis of the time, the unit ID, and the like, and the content data can be played only when the two passwords match each other.

Content data to be played (content data recorded in the content-data recording unit 207) include that obtained from the service center 1 and that copied from another information player. According to an aspect of the present invention, no particular restrictions are imposed on the manner of obtaining content data to be played.

The above-described restriction is imposed on the act of viewing/listening (the act in the above example is "playback") to content data imported into the user unit 2 (content data recorded in the content-data recording unit 207) using the user unit 2.

When a particular user unit (serving as a first user unit 2*a* for the sake of convenience) tries to copy content data obtained from the service center 1 to another unit with a function of, as in the first user unit 2*a*, playing this content data (serving as a second user unit 2*b* for the sake of convenience), the content data in the first user unit 2*a* is copied to the second user unit 2*b* and recorded in a content-data recording unit of the second user unit 2*b*. Subsequently, the second user unit 2*b* is registered with the service center 1, and, after the registration, the second user unit 2*b* plays the content data. Such usage enhances user-friendliness.

Although the user-performed operation is playback in the above-described case, the user-performed operation is not limited to playback. Similarly, the user unit 2 creates a one-time password in response to each of various operations for each operation. Preferably, this one-time password is created using, in addition to the unit ID information and the current time information, which are essential to create the one-time password, operation information at that time. In addition to these pieces of information, content data and the user ID may additionally be used.

In contrast, since the unit ID information, the current time information, and the operation information at that time are transmitted from the user unit 2 to the service center 1, the service center 1 uses, in addition to the current time information obtained from the time keeping unit 101 of the service center 1, the current time information, the unit ID information, and the user operation information, which are transmitted from the user unit 2, and refers to the unit-ID recording unit 102, the unit-information recording unit 104, and the like to create a one-time password. This one-time password and an operation permission command in response to the user operation at that time are transmitted to the user unit 2.

When the user unit 2 receives the one-time password and the operation permission command transmitted from the service center 1, the control command unit 206 of the user unit 2 compares the one-time password created by the password creating unit 203 with the one-time password transmitted from the service center 1 and determines whether the two passwords match each other. When the two passwords match each other, the user-performed operation is executed.

A case in which the user transmits (copies), of content data stored in the user unit 2, a particular piece of content data to another user unit, will now be described.

In this case, the user uses the unit operation section 205 of the user unit 2 (serving as the first user unit 2*a*, which corresponds to the user unit 2 described above) to select content data to be transmitted (copied) to another unit (serving as the second user unit 2*b*) and to perform an operation to copy the content data. On the basis of the user operation, the control command unit 206 reads the content data to be copied from the content-data recording unit 207 and outputs this content data from the content-data transmitter 210.

In this case, the content data output from the content-data transmitter 210 is digital data recorded in the content-data recording unit 207 (encoded, encrypted digital data) (the content data may be converted into a format that can be transmitted to the second user unit 2*b* to which the content data is to be copied).

To copy the content data, a one-time password is created in response to the user operation on the basis of, in addition to the unit ID information, the content data information, and the user-performed operation information ("copy" in this case), the current time information obtained from the time keeping unit 201. The unit ID information, the content data information to be copied, and the user-performed operation information are transmitted from the data transmitter-receiver 204 to the service center 1.

At the same time, the password creating unit 103 creates a one time password on the basis of the unit ID information, the content data information, the user-performed operation information, and the current time information, which are transmitted from the first user unit 2*a*, and the current time information obtained from the time keeping unit 101 of the service center 1, by referring to the unit-ID recording unit 102, the user-information recording unit 106, and the like. This one-time password and an operation permission command in response to the user operation request at that time are transmitted to the first user unit 2*a*.

When the first user unit 2*a* receives the one-time password and the operation permission command transmitted from the service center 1, the control command unit 206 compares the one-time password created by the password creating unit 203 of the first user unit 2*a* with the one-time password transmitted from the service center 1 and determines whether the two passwords match each other. When the two passwords match each other, the user-performed operation is executed. In other words, since the user tries to copy, of the content data recorded in the content-data recording unit 207 of the first user unit 2*a*, the user-selected content data to another unit (second user unit 2*b*) in this case, the control command unit 206 generates a signal permitting the first user unit 2*a* to copy the content data.

Of the content data recorded in the content-data recording unit 207 of the first user unit 2*a*, the data processor 208 reads the user-selected content data and converts the data into a format that can be transmitted to the second user unit 2*b*. This content data (encoded, encrypted digital data) is transmitted from the content-data transmitter 210 to the second user unit 2*b* at the copy destination.

Having received the content data transmitted from the first user unit 2*a*, the second user unit 2*b* records the content data in its content-data recording unit. Accordingly, the content data recorded in the first user unit 2*a* is copied to the second user unit 2*b*.

At this time, when the second user unit 2*b* has performed an in-advance process, which is similar to that performed by the first user unit 2*a* (see FIG. 3), with the service center 1, the content data copied to the content-data recording unit of the second user unit 2*b* can be played, as in the first user unit 2*a*.

In contrast, when the second user unit 2*b* has not performed an in-advance process, which is similar to that performed by the first user unit 2*a*, with the service center 1, the content data copied to the content-data recording unit of the second user unit 2*b* cannot be played.

In other words, as described above, even when the second user unit 2*b* transmits the unit ID information of the second user unit 2*b*, the user ID information, the content data information to be played, and the user-performed operation information ("playback" in this case) from a data transmitter-receiver of the second user unit 2*b* to the service center 1, and when the second user unit 2*b* creates a one-time password on the basis of the unit ID information, the user ID information, the content data information, the user-performed operation information, and the current time information obtained from a time keeping unit of the second user unit 2*b*, the service center 1 does not create the same one-time password as that created at the second user unit 2*b* side, unless the second user unit 2*b* or the user ID of the user using the second user unit 2*b* has been registered with the service center 1.

In the second user unit 2*b*, the one-time password created by the second user unit 2*b* does not match the one-time password transmitted from the service center 1. The user-desired playback operation is refused, and the content data copied from the first user unit 2*a* is not played.

As described above, according to the first exemplary embodiment, when the user unit 2 tries to, for example, play content data obtained via a network and recorded in the content-data recording unit 207 of the user unit 2 or content data copied from another unit and recorded in the content-data recording unit 207 of the user unit 2, the user unit 2 determines whether a one-time password created by the user unit 2 matches a one-time password created by the service center 1. The playback operation is valid only when the two passwords match each other, and hence the content data can be played.

To obtain content data from the service center 1, an in-advance process, such as that described with reference to FIG. 3, is performed, thereby easily obtaining the content data. The obtained content data can be stored in the content-data recording unit 207 of the user unit 2. The content data include not only that obtained from the service center 1, but also that copied from another unit.

According to an aspect of the present invention, although content data can be obtained or copied easily, a restriction is imposed on the use (such as playback) of the content data.

According to an aspect of the present invention, every time the user performs, not only a playback operation, but also various operations to use a particular piece of content data on the user unit 2, the unit ID of the user unit 2, operation information indicating the type of operation, content data information at that time, and current time information are transmitted to the service center 1. In response to the operation, the user unit 2 creates a one-time password based on the current time, the unit ID, the operation information, and the like. Also, the service center 1 creates a one-time password based on these pieces of information transmitted from the user unit 2 and the current time information obtained from the time keeping unit 101 of the service center 1. The user unit 2 compares whether these passwords match each other. The user-desired operation is executable only when the two passwords match each other.

A one-time password may be created for every operation performed by the user. Alternatively, the type of operation for which a one-time password must be created may be determined in advance, and a one-time password may be created only when such a predetermined operation is performed.

It is preferable that, every time an operation for which the creation of a one-time password is unnecessary is performed, the unit ID, operation information (information indicating the type of operation performed), and information on content data (the type of content data selected) be transmitted to the service center 1.

By transmitting such information to the service center 1, the user operation and user preferences can be detected at the service center 1 side. For example, by detecting the user operation status, when viewed from the service center 1 side, a fee can be charged for every operation performed by the user. Accordingly, legitimate and detailed fee settings can be designed. For example, a fee charged for playback can be changed depending on the details of content data. Fee settings associated with various operation types, such as a fee charged for repeated playback and a fee charged for transferring content data to another unit, can be designed.

By detecting information on content data, the user preferences, such as the type of content data preferred by the user, can be detected. Such information on content data can be used in advertisement aimed at individual users.

When viewed from the user side, which receives the service, a fee is charged in accordance with the details of the operation. The user is only required to pay the fee for the actual usage. The user thus becomes less dissatisfied with the usage fee.

According to an aspect of the present invention, a password serving as a key for using (such as playing) content data on the user unit 2 is a one-time password that is created on the basis of the current time and that is valid only for a short, limited time. This reduces or prevents unauthorized use, which may occur due to using a content key for a predetermined period of time, as in related art services. Since a one-time password can be created using a not-so-complex algorithm, no complex arithmetic operation is performed.

When the user performs an operation, such as playback, the time required from the creation of a one-time password by user unit 2 and the creation of a one-time password by the service center 1 to the determination by the user unit 2 of whether the two one-time passwords match each other is a very short period of time. When viewed from the user side, the user need not be aware of the above-described processing time, and it seems to the user as if the user were operating the unit in a normal manner. When the one-time password created by the user unit 2 matches the one-time password created by the service center 1, the user-performed operation is executed. When the two passwords do not match each other, the user-performed operation is not executed.

Although the one-time password and the operation permission command are transmitted from the service center 1 to the user unit 2 in the above-described example, the operation permission command need not be transmitted. In this case, the control command unit 206 of the user unit 2 determines whether the one-time password transmitted from the service center 1 matches the one-time password created by the user unit 2. Only when the two passwords match each other, the control command unit 206 outputs a signal that makes the user-performed operation valid.

Second Exemplary Embodiment

Figure 5:
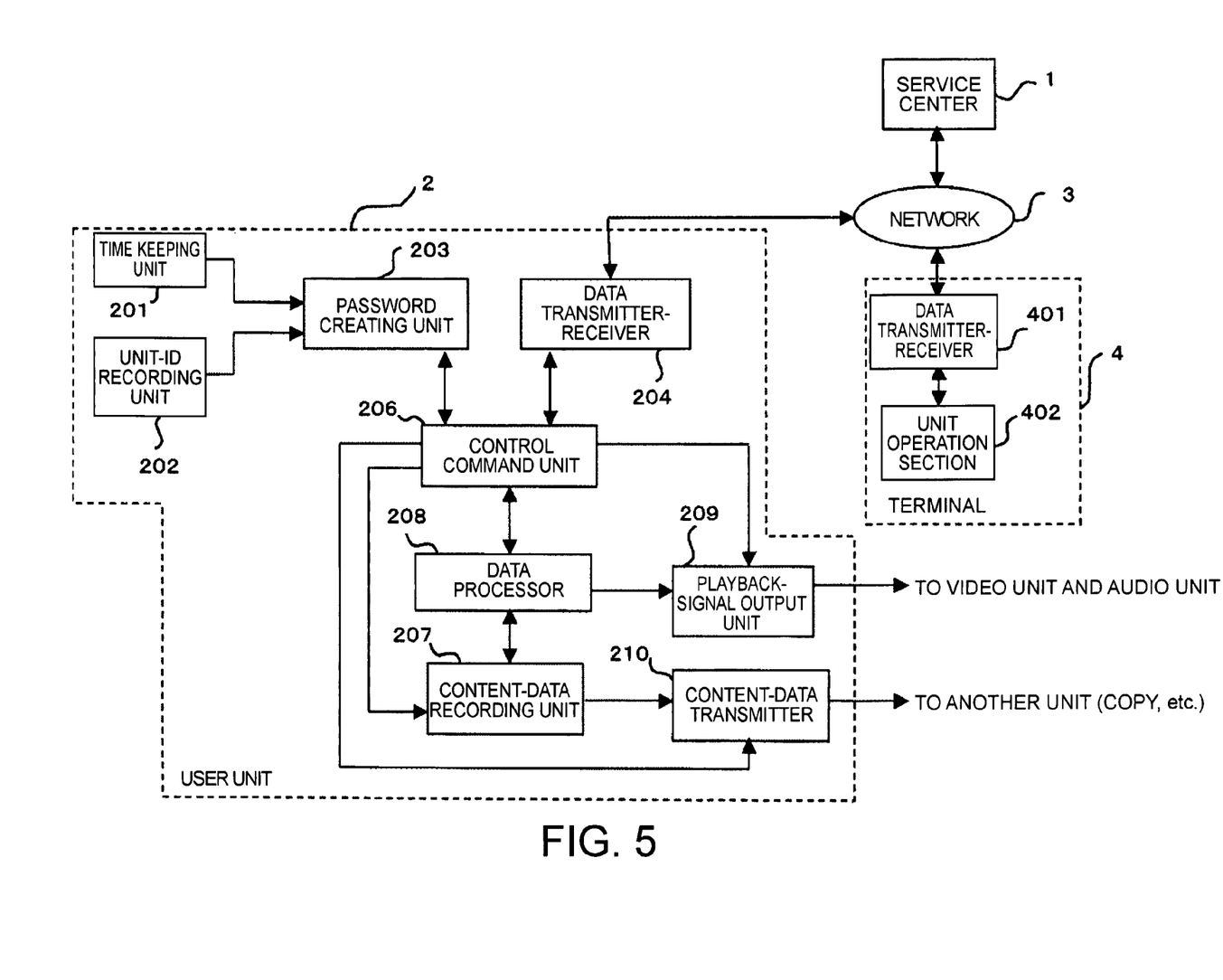
FIG. 5 illustrates a second exemplary embodiment of the present invention, which is a block schematic of an example of a system in which, in addition to the information player (user unit) at the user side, a terminal capable of transmitting and receiving information to and from the information provider (service center) is prepared, and, using this terminal, a signal is exchanged with the service center to operate the user unit.

A second exemplary embodiment, as shown in FIG. 5, is a system in which, in addition to the user unit 2, a terminal 4 that can transmit and receive information to and from the service center 1 is prepared, and the user unit 2 is operated using this terminal 4.

The terminal 4 shown in FIG. 5 includes a data transmitter-receiver 401 to communicate with the service center 1 and a unit operation section 402 capable of operating the user unit 2. The terminal 4 may be a dedicated terminal associated with a particular user unit 2 or may be in a format that can be commonly used for a plurality of user units 2 (as in a cellular phone or the like).

Although the user unit 2 may have the same arrangement as that shown in FIG. 1, the unit operation section 205 shown in FIG. 1 may be omitted if the unit is operated entirely by the terminal 4. In FIG. 5, the unit operation section 205 is omitted.

When the terminal 4 is a dedicated terminal associated with a particular user unit 2, the terminal 4 may have the unit ID of the associated user unit 2 and transmit the unit ID to the service center 1. Alternatively, the terminal 4 may read the unit ID from the unit-ID recording unit 202 of the user unit 2. When the unit ID is indicated by a barcode or the like on the user unit 2, this barcode may be scanned.

When the terminal 4 is shared by another user unit 2, as described above, the unit ID may be read from the unit-ID recording unit 202 of the user unit 2, or the ID indicated by a barcode or the like may be scanned. That is, the terminal 4 must somehow read the unit IDs from the individual user units 2.

When the unspecific terminal 4 is used to read the unit ID of the user unit 2, unauthorized use may occur in which, for example, the unit ID of the user unit 2 is stolen, and, using this unit ID, content data is used on another user unit (in this case, the user unit having stolen the unit ID is not charged a fee; instead, the owner of the user unit 2 having the stolen user unit ID is charged a fee).

As described above, this problem can be addressed to a certain degree by using tamper-resistant hardware or software to implement the password creating unit 203 of the user unit 2, the password creating unit 103 of the service center 1, the unit-ID recording unit 202 of the user unit 2, the unit-ID recording unit 102 of the service center 1, the user-information recording unit 106 of the service center 1, the data processor 208 of the user unit 2, and the data processor 108 of the service center 1. To further reduce or prevent such unauthorized use, the following is adopted.

First, a password creating algorithm that is unique to each user unit 2 is used for each of individual user units 2. Even when the unit ID of the user unit 2 is stolen, the unit having stolen this unit ID cannot create a one-time password that is unique to the user unit 2. In this case, the type of password creating algorithm is determined in such a manner that, for example, a password creating algorithm that is unique to the user unit 2 may be obtained from the service center 1 at the time the user unit 2 registers itself with the service center 1. Alternatively, the user unit 2 may determine the type of password creating algorithm and notify the service center 1 of the determined type.

Second, necessary information to create a password includes, in addition to the user unit ID and the current time, a number or a symbol string that is unique to the user unit 2. As such, even when the unit ID of the user unit 2 is stolen by another unit, the unit having stolen the unit ID cannot create a one-time password that is unique to the user unit 2. In this case, the service center 1 must be notified of, at the time the user unit 2 is registered with the service center 1, the type of information used to create a one-time password.

As in the system shown in FIG. 5, in the second exemplary embodiment in which the terminal 4 is prepared in addition to the user unit 2, an in-advance process of registering the user unit 2 with the service center 1 is performed by the method (A) or (B) described with reference to FIG. 3, as in the first exemplary embodiment.

According to the second exemplary embodiment, the terminal 4 can be used to perform an in-advance process using the method (B). Specifically, the terminal 4 is only required to transmit the user ID, the details of a contract, the unit ID, and the like from the data transmitter-receiver 401 of the terminal 4 to the service center 1. When the unit ID is stored in advance in the terminal 4, the terminal 4 transmits this unit ID to the service center 1. When the terminal 4 has no unit ID stored therein, as described above, the terminal 4 somehow reads the unit ID and transmits the unit ID to the service center 1.

When the service center 1 is notified of such information by the terminal 4, the service center 1 confirms the user ID, the unit ID, the details of the contract, and the like and registers the user ID, the details of the contract, and the like in the user-information recording unit 106 and records the unit ID in the unit-ID recording unit 102.

When the user unit 2 is provided with the unit operation section 205, this in-advance process may be performed, not by the terminal 4, but by the user unit 2, as in the first exemplary embodiment. In other words, the terminal 4 may be used to only perform an operation such as playback.

When the in-advance process is completed, various operations, such as playback of content data, can be performed using the user unit 2. Since this is the same as that in the first exemplary embodiment described above, a process of playing content data will briefly be described.

The user selects a particular piece of content data from among a plurality of pieces of content data recorded in the content-data recording unit 207 of the user unit 2 and performs an operation to play the selected content data. This operation is performed using the terminal 4. When the user performs such an operation using the terminal 4, the terminal 4 transmits the unit ID, the user-selected content information, operation request information indicating the type of operation performed ("playback" in this case), and the like to the service center 1.

When the service center 1 receives these pieces of information, the service center 1 notifies the user unit 2 of the playback operation request from the terminal 4. Accordingly, the user unit 2 creates a one-time password based on at least the current time information from the time keeping unit 201 and the unit ID of the user unit 2 and transmits the current time information to the service center 1.

On the basis of various types of information transmitted from the terminal 4, the current time information transmitted from the user unit 2, and the current time information obtained from the time keeping unit 101 of the service center 1, the service center 1 creates a one-time password by referring to the unit-ID recording unit 102 and the user-information recording unit 106. The service center 1 adds an operation permission command to this one-time password and transmits them to the user unit 2.

When the user unit 2 receives the one-time password and the operation permission command transmitted from the service center 1, the control command unit 206 compares the one-time password created by the password creating unit 203 of the user unit 2 with the one-time password transmitted from the service center 1 and determines whether the two passwords match each other. When the two passwords match each other, the user-performed operation is executed. In other words, since the user tries to perform playback in this case, the control command unit 206 generates a signal that enables playback.

Accordingly, the data processor 208 of the user unit 2 reads the user-selected content data from among the content data recorded in the content-data recording unit 207 and decrypts the content data so that the content data can be played, and the decrypted signal is output from the playback signal output unit 209.

When the terminal 4 is prepared in addition to the user unit 2 and when information is exchanged between the terminal 4 and the service center 1, various operations, such as playback of content data, can be performed on the user unit 2.

Figure 6:
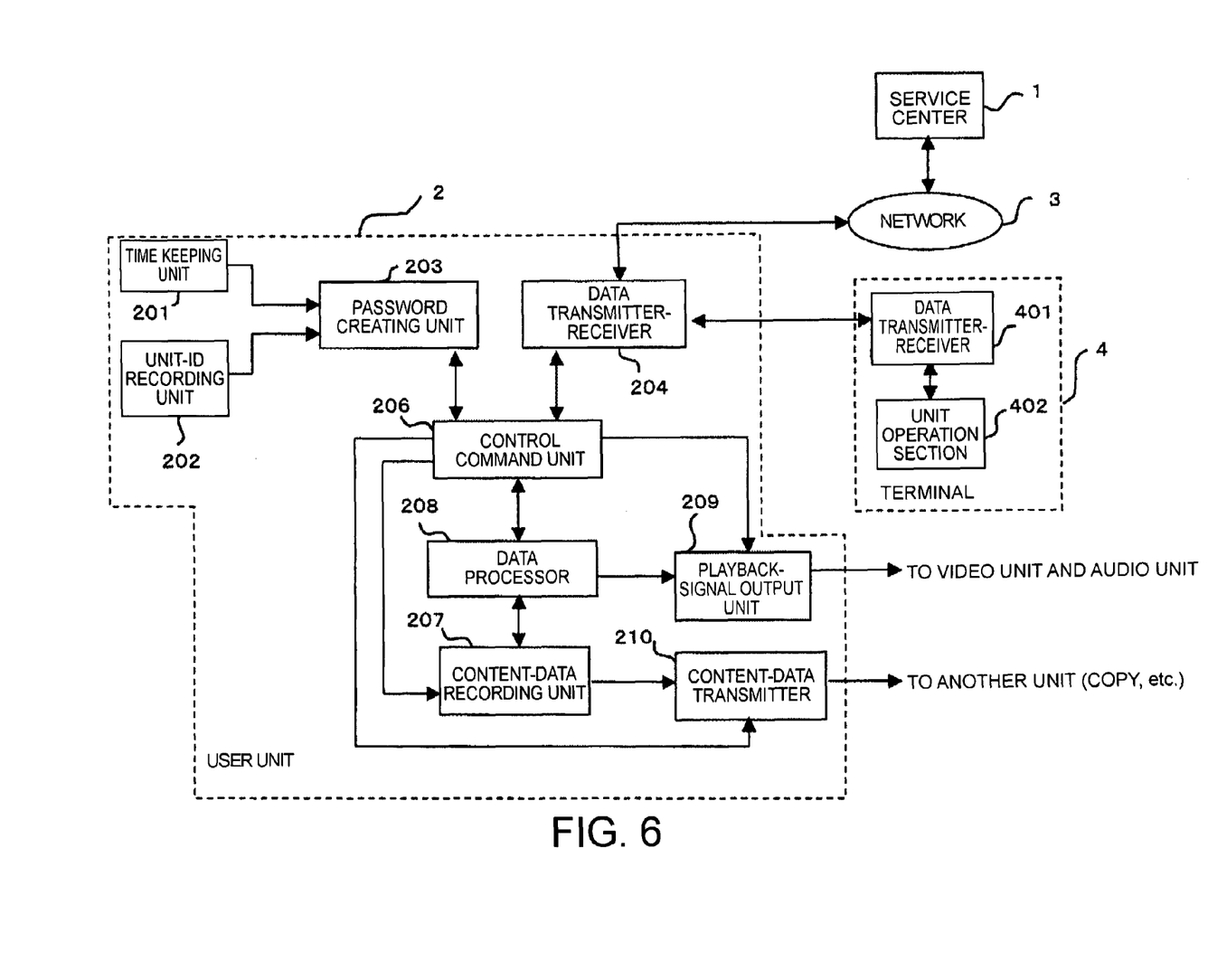
FIG. 6 illustrates a modification of the system shown in FIG. 5, which is a block schematic showing an example of a system in which, using the terminal, the information player (user unit) at the user side is operated.

Another example of using the terminal 4 to operate the user unit 2 includes a case in which, instead of exchanging a signal between the user unit 2 and the terminal 4 to operate the user unit 2.

FIG. 6 shows the configuration of a system in this case. FIG. 6 differs from FIG. 5 in that a signal is exchanged not between the terminal 4 and the service center 1, but between the terminal 4 and the user unit 2. In this case, the terminal 4 is used to operate the user unit 2. Since the example of FIG. 6 involves the same processing as that described in the first exemplary embodiment except that the in-advance process and various operations, such as playback, can be performed using the terminal 4, a repeated description thereof is omitted.

The present invention is not limited to the above-described exemplary embodiments, and various modifications can be made within the scope of the present invention. For example, when the user performs an operation such as playback, information that must be transmitted to the service center 1 includes the unit ID, current time information, information on content data, such as the content data name, and operation information indicating the type of operation performed. However, this is only one example, and, besides the essential elements including the unit ID, information to be transmitted to the service center 1 is selected appropriately depending on the type of operation performed on the user unit 2, the type of processing performed by the service center 1, and the like.

A processing program including a process of achieving an aspect of the present invention may be created, and this processing program may be recorded in a recording medium, such as a floppy disk, an optical disk, or a hard disk. An aspect of the present invention includes a recording medium having such a processing program recorded thereon. Such a processing program may be obtained via a network. Advantages As described above, according to an aspect of the present invention, when a user performs a particular operation to use content data recorded in an information player, this information player creates a password that is valid for a predetermined period of time (one-time password). At the same time, an information provider creates a password that is valid for a predetermined period of time (one-time password) on the basis of information transmitted from the information player and current time information obtained from a time keeping unit of the information provider and transmits the password to the information player. The information player compares the password transmitted from the information provider with the password created by the information player. When the comparison result verifies the passwords, the operation requested by the user is executed. In other words, a restriction, such as password matching, is imposed on the use of content data recorded in the information player. Use of the content data is permitted only when the passwords match each other.

This reliably reduces or prevents unauthorized use of content data by a unit that is not registered with the information provider. To obtain content data from the information provider, the information player is registered with the information provider, thereby easily obtaining the content data. The obtained content data can be stored in a content-data recording unit of the information player. The content data includes not only that obtained from the service center, but also that copied from another unit.

According to an aspect of the present invention, although content data can be obtained or copied easily, a restriction is imposed on the use (such as playback) of the content data.

According to an aspect of the present invention, when content data is to be played, user-performed operation information and information concerning content data, such as that indicating the piece of content data selected by the user, are transmitted to the service center. Therefore, the user-performed operation and user preferences can be detected at the service center side. For example, by detecting the user operation, when viewed from the service center side, a fee can be charged for every operation performed by the user. Accordingly, legitimate and detailed fee settings can be designed. For example, a fee charged for playback can be changed depending on the details of content data. Fee settings associated with various operation types, such as a fee charged to repeat playback and a fee charged to transfer content data to another unit, can be designed. By detecting information on content data, the user preferences, such as the type of content data preferred by the user, can be detected. Such information on content data can be used in advertisement aimed at individual users.

When viewed from the user side, which receives the service, a fee is charged in accordance with the details of the operation. The user is only required to pay the fee for the actual usage. The user thus becomes less dissatisfied with the usage fee.

According to an aspect of the present invention, a password serving as a key for using, such as playing, content data on a unit is a one-time password based on the current time. This reduces or prevents unauthorized use, which may occur due to using a content key for a predetermined period of time, as in related art services. Since a one-time password can be created using a not-so-complex algorithm, no great load is placed on an arithmetic processing unit.

What is claimed is:

1. An information viewing/listening system, comprising:
  an information provider that stores content data; and
  an information player that establishes a connection to the information provider via a network and plays information,
  when a user makes a request for an operation to the information player for use of content data recorded in the information player, the information player creates a password using preset information and transmits the preset information to the information provider,
  when the information provider receives the preset information transmitted from the information player, the information provider creates a password using preset information and transmits the password to the information player, and when the information player compares the password transmitted from the information provider with the password created by the information player and when, as a result of comparison, the passwords are verified, the information player executes the operation requested by the user.

2. The information viewing/listening system according to claim 1, the preset information including at least current time information and unit-unique information that is unique to the information player, and the password created using the preset information is a password that is valid only for a predetermined period of time.

3. The information viewing/listening system according to claim 1, the creation of the password by the information player and, in response thereto, the creation of the password by the information provider for the information player being performed when a playback request to playback the content data recorded in the information player is made, the playback being one of a plurality of operations performed on the information player by the user.

4. The information viewing/listening system according to claim 1, the creation of the password by the information player and, in response thereto, the creation of the password by the information provider for the information player being performed when any of operation requests for a plurality of predetermined types of operations is made, the operations being among the plurality of operations performed on the information player by the user.

5. The information viewing/listening system according to claim 1, when the information player obtains content data from the information provider or another information player, the information player being permitted to obtain the content data without creating the password.

6. The information viewing/listening system according to claim 2, necessary information to create the password including, in addition to the unit-unique information and the current time information, at least one of operation information indicating an operation performed by the user, information indicating the content data for which the operation is performed, and user information concerning the user.

7. The information player, used in an information viewing/listening system, that establishes a connection via a network to an information provider having content data stored therein and that is capable of at least playing content data recorded therein, comprising:

content-data recording device to record content data obtained from the information provider or another information unit;

unit-unique-information recording unit to record unit-unique information that is unique to the information player;

time-information output device to output current time information;

playback-signal output device to output, as a playback signal, the content data recorded in the content-data recording device;

password creating device to create a password using preset information when a user makes an operation request to the information player,
wherein the preset information is transmitted to the information provider;

a control command unit to verify, as a control command process, the validity of the password and, when the validity is verified, making the operation request valid; and a data transmitter-receiver to exchange a signal with the information provider via the network.

8. The information player according to claim 7, the preset information to create the password including at least the current time information and the unit-unique information unique to the information player, and the password created using the present information being a password that is valid only for a predetermined period of time.

9. The information player according to claim 7, the creation of the password being performed when a playback request to playback the content data recorded in the information player is made, the playback being one of a plurality of operations performed on the information player by the user.

10. The information player according to claim 7, the creation of the password being performed when any of operation requests for a plurality of predetermined types of operations is made, the operations being among the plurality of operations performed on the information player by the user.

11. The information player according to claim 7, when the information player obtains content data from the information provider or another information player, the information player being permitted to obtain the content data without creating the password.

12. The information player according to claim 8, necessary information to create the password including, in addition to the unit-unique information and the current time information, at least one of operation information indicating an operation performed by the user, information indicating the content data for which the operation is performed, and user information concerning the user.

13. The information provider capable of providing content data to an information player at a user side, the information player being registered by a predetermined process, comprising:

a data transmitter-receiver to exchange a signal with the information player via a network;

a content-data recording unit to store content data that can be provided to the registered information player;

a unit-unique-information recording unit to record unit-unique information unique to each registered information player;

a user-information recording unit to record, as user information, information concerning the user using the registered information player;

a unit-information recording unit to record, as unit information, information concerning each information player, the information including a function of the registered information player;

time-information output device to output current time information; and password creating device to create a password using preset information received from the information player when the information player performs an operation.

14. The information provider according to claim 13, the preset information to create the password including at least the current time information and the unit-unique information unique to the information player, and the password created using the present information being a password that is valid only for a predetermined period of time.

* * * * *